United States Patent
Chen et al.

(10) Patent No.: US 10,671,968 B2
(45) Date of Patent: Jun. 2, 2020

(54) METHOD AND SYSTEM OF PROCESSING COMMODITY OBJECT INFORMATION

(71) Applicant: Cainiao Smart Logistics Holding Limited, Grand Cayman (KY)

(72) Inventors: Yueyang Chen, Hangzhou (CN); Junwei Kang, Hangzhou (CN); Debing Ding, Hangzhou (CN)

(73) Assignee: Cainiao Smart Logistics Holding Limited, Grand Cayman (KY)

( * ) Notice: Subject to any disclaimer, the term of this patent is extended or adjusted under 35 U.S.C. 154(b) by 617 days.

(21) Appl. No.: 14/692,644

(22) Filed: Apr. 21, 2015

(65) Prior Publication Data
US 2015/0310384 A1 Oct. 29, 2015

(30) Foreign Application Priority Data
Apr. 23, 2014 (CN) .......................... 2014 1 0166069

(51) Int. Cl.
*G06Q 10/00* (2012.01)
*G06Q 30/00* (2012.01)
(Continued)

(52) U.S. Cl.
CPC ......... *G06Q 10/087* (2013.01); *G06Q 10/083* (2013.01); *G06Q 30/0635* (2013.01)

(58) Field of Classification Search
None
See application file for complete search history.

(56) References Cited

U.S. PATENT DOCUMENTS

| 7,778,891 B1 * | 8/2010 | Zhang | G06Q 10/087 |
| | | | 705/28 |
| 8,527,373 B1 * | 9/2013 | Ricci | G06Q 10/087 |
| | | | 705/22 |

(Continued)

FOREIGN PATENT DOCUMENTS

| CN | 102609868 A | 7/2012 |
| CN | 102682398 A | 9/2012 |

(Continued)

OTHER PUBLICATIONS

PCT Search Report and Written Opinion dated Jul. 27, 2015 for PCT Application No. PCT/US15/26946, 9 Pages.

(Continued)

*Primary Examiner* — Ariel J Yu
(74) *Attorney, Agent, or Firm* — Sheppard Mullin Richter & Hampton LLP

(57) ABSTRACT

A method and system of processing commodity object information. The method includes: determining a commodity object as a future for conducting an advance sale and an advance sale quantity; determining information of a first user of the commodity object of the advance sale and information of a physical logistics warehouse associated with the first user; generating information of a virtual logistics warehouse of the commodity object of the advance sale; and acquiring address information of a second user and determining whether the address information of the second user is located in a distribution coverage of the virtual logistics warehouse when logistics warehouse information of the commodity object is displayed to the second user, and providing the information of the virtual logistics warehouse of the commodity object to the second user if affirmative. The present disclosure can avoid an occurrence of an event (Continued)

such as "over-sale", exceeding a distribution coverage, etc., during a future advance sale.

20 Claims, 6 Drawing Sheets

(51) Int. Cl.
*G06Q 10/08* (2012.01)
*G06Q 30/06* (2012.01)

(56) References Cited

U.S. PATENT DOCUMENTS

| | | |
|---|---|---|
| 2001/0032146 A1 | 10/2001 | Kutaragi et al. |
| 2002/0133387 A1 | 9/2002 | Wilson et al. |
| 2002/0147667 A1 | 10/2002 | Shiba et al. |
| 2003/0004839 A1 | 1/2003 | Lin et al. |
| 2003/0110104 A1* | 6/2003 | King ............ G06Q 10/087 705/28 |
| 2003/0216975 A1 | 11/2003 | Montey et al. |
| 2004/0093233 A1 | 5/2004 | Teller |
| 2004/0158506 A1 | 8/2004 | Wille |
| 2005/0006456 A1 | 1/2005 | White |
| 2005/0091129 A1 | 4/2005 | Tien |
| 2005/0177435 A1 | 8/2005 | Lidow |
| 2005/0267791 A1 | 12/2005 | LaVoie et al. |
| 2006/0080189 A1 | 4/2006 | Takahashi et al. |
| 2008/0097888 A1 | 4/2008 | Sugihara |
| 2008/0301068 A1 | 12/2008 | Fager et al. |
| 2009/0012865 A1* | 1/2009 | Celik ............ G06F 17/30386 705/14.48 |
| 2009/0254447 A1* | 10/2009 | Blades ............ G06Q 10/083 705/26.1 |
| 2011/0119181 A1* | 5/2011 | Puleo ............ G06Q 20/105 705/41 |
| 2012/0036072 A1 | 2/2012 | Riggs et al. |
| 2012/0084119 A1 | 4/2012 | Vandehey et al. |
| 2012/0310789 A1 | 12/2012 | Hayatsu et al. |
| 2013/0080217 A1* | 3/2013 | Abhyanker ............ G06Q 30/08 705/14.1 |
| 2014/0064532 A1* | 3/2014 | Litvak ............ A61N 1/36 381/326 |
| 2015/0142602 A1* | 5/2015 | Williams ............ G06Q 30/0631 705/26.7 |

FOREIGN PATENT DOCUMENTS

| | | |
|---|---|---|
| CN | 102930466 A | 2/2013 |
| CN | 103065257 A | 4/2013 |
| CN | 103544601 A | 1/2014 |
| CN | 103632281 A | 3/2014 |
| JP | 2001-222577 A | 8/2001 |
| JP | 2002-117300 A | 4/2002 |
| JP | 2011-059863 A | 3/2011 |
| JP | 2011-175585 A | 9/2011 |

OTHER PUBLICATIONS

First Search issued by China State Intellectual Property Office, dated Mar. 25, 2018, for Chinese Patent Application No. 201410166069.1, 1 page.
International Preliminary Report on Patentability dated Oct. 25, 2016, issued in International Application No. PCT/US2015/026946 (8 pages).
Chinese First Office Action dated Apr. 3, 2018, issued in Chinese Patent Application No. 201410166069.1 (3 pages).
Supplemental Search dated Nov. 23, 2018, issued in related Chinese Patent Application No. 201410166069.1 (1 page).
Decision to Grant a Patent dated Jan. 8, 2019, issued in related Japanese Patent Application No. 2016-561007 (6 pages).
Second Office Action dated Dec. 3, 2018, issued in related Chinese Application No. 201410166069.1 (7 pages).
Supplementary Search dated Jun. 12, 2019, issued in related Chinese Application No. 201410166069.1 (1 page).
Third Office Action dated Jun. 20, 2019, issued in related Chinese Application No. 201410166069.1 (20 pages), w/ English machine translation.

* cited by examiner

METHOD AND SYSTEM OF PROCESSING COMMODITY OBJECT INFORMATION

CROSS REFERENCE TO RELATED PATENT APPLICATION

This application claims foreign priority to Chinese Patent Application No. 201410166069.1 filed on Apr. 23, 2014, entitled "Method and System of Processing Commodity Object Information", which is hereby incorporated by reference in its entirety.

TECHNICAL FIELD

The present disclosure relates to the technological field of electronic commerce transaction platforms, and in particular, to methods and systems of processing commodity object information.

BACKGROUND

Along with the continuous development of electronic commerce transaction platforms and the rapid growth of technologies such as conventional communications and mobile communications, an increasing number of people acquire commodities they desire through online shopping. The types of commodities may involve every aspect of daily lives of the people, which include, for example, commodities of categories such as house appliances and furniture, etc. For these types of commodities, common logistics providers may not be able to provide corresponding distribution services due to such properties of the commodities as large volume, heavy weight and vulnerability etc., and users generally need to bear high distribution costs. Therefore, selling commodities of categories, such as house appliances and furniture, etc., in e-commerce transaction platforms faces difficulties.

Therefore, some e-commerce transaction platforms provide a unified logistics service for a first user of these types of commodities. The service first provides a plurality of logistics warehouses, with each warehouse having a distribution coverage thereof. For example, the first user (such as a seller, etc.) of house appliances may subscribe to one or more logistics warehouses according to a target marketing region thereof, and store commodities thereof in the subscribed logistics warehouses. When a second user (such as a buyer, for example) views a commodity in commodity details or purchase interface, an e-commerce transaction platform may perform matching for a coverage of a logistics warehouse based on an address where the second user is located, and display an inventory in the logistics warehouse to the second user upon successful matching. After the second user pays for an order, a logistics order is generated and sent to a logistics system. The logistics system makes a delivery accordingly, and "the goods of the seller" are distributed to the second user through a series of distribution nodes. For a selling user, the logistics system is a product that integrates resources of various logistics nodes (such as warehousing, transfer stations, and distribution, etc.) and provides a convenient logistics service, which meanwhile can improve the quality of the logistics service and reduce the logistics cost.

In a real application, a first user who has subscribed to a logistics warehouse always needs to run some promotion activities in order to obtain more sales channels to increase sales volume, such as conducting an advance sale of his/her goods. A major difference of an advance sale from a common online sale of commodities is that a payment of the second user is generally divided into two installments: the first one is a payment of a deposit, and the second action is a payment of a remaining balance. In general, the advance sale may be classified into two types: a spot advance sale and a future advance sale. The so-called spot advance sale refers to an advance sale of commodities currently stored in a logistics warehouse, and a specific solution has been provided for this type of advance sale in existing technologies. For example, a commodity details page or a purchase operation page may request an inventory center to acquire a regional inventory display. Based on a delivery address of the current second user, the inventory center acquires a corresponding list of warehouses subscribed by the first user that cover a region of the delivery address, and obtains an inventory of a warehouse that meets associated condition(s) to return to the commodity details page or the purchase operation page for display. Meanwhile, the second user is requested to pay a deposit within a certain period of time to generate a transaction order, and pay the remaining balance within a certain period of time to generate a logistics order, so that a delivery can be made for the user.

On the other hand, futures are commodities that are not in stock in a current warehouse and need to wait for new production, or commodities that have been produced but are not put in storage. Correspondingly, the future advance sale refers to an advance sale of commodities that are waiting for new production or commodities that have been produced but are not put in storage. Since no commodity is in stock during an advance sale for this type of advance sale, avoiding an event of "over-sale" in which sales volume exceeds commodity inventory volume or an event of exceeding a distribution coverage during the future advance sale, so as to avoid a waste of network computing resources and consumption of time and energy of users, has become a technical problem that needs to be solved urgently by one skilled in the art.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a method and a system of processing commodity object information, which can avoid events such as "over-sale" or exceeding a distribution coverage during a future advance sale.

The present disclosure provides the following solutions:

A method of processing commodity object information, includes:

determining a commodity object as a future for conducting an advance sale and an advance sale quantity;

determining information of a first user of the commodity object of the advance sale and information of a physical logistics warehouse associated with the first user;

generating information of a virtual logistics warehouse of the commodity object of the advance sale, the information of the virtual logistics warehouse including a virtual inventory quantity and information of a distribution coverage of the virtual logistics warehouse; wherein the virtual inventory quantity is determined based on the advance sale quantity, and the information of the distribution coverage of the virtual logistics warehouse is determined based on a distribution coverage of the physical logistics warehouse associated with the first user; and acquiring address information of a second user and determining whether the address information of the second user is located in the distribution coverage of the virtual logistics warehouse when logistics warehouse information of the commodity object is displayed to the second user, and providing the information of the virtual logistics warehouse of the commodity object to the second user if affirmative.

A method of processing commodity object information, includes:

determining whether a designated commodity object is a commodity object treated as a future for conducting an advance sale by querying an inventory system database when logistics warehouse information of the designated commodity object is displayed to a second user, the inventory system database storing identifiers and virtual logistics warehouse information associated with commodity objects treated as futures for conducting advance sales, and the virtual logistics warehouse information including a virtual inventory quantity;

providing virtual logistics warehouse information of the designated commodity object to the second user if affirmative;

generating a transaction order based on a first operation of the second user, and adding a future advance sale identifier in the transaction order;

generating a logistics order based on a second operation of the second user, and identifying that the generated logistics order is a future advance sale logistics order based on the future advance sale identifier in the transaction order;

determining a first user of the designated commodity object, and determining information of a physical logistics warehouse associated with the first user; and sending the generated logistics order to a warehousing system to notify the warehousing system to perform a delivery when an actual inventory related to the designated commodity object in the associated physical logistics warehouse satisfies a preset condition.

A system of processing commodity object information, includes:

a commodity object determination unit, used for determining a commodity object as a future for conducting an advance sale and an advance sale quantity;

a physical logistics warehouse information determination unit, used for determining information of a first user of the commodity object of the advance sale and information of physical logistics warehouse(s) associated with the first user;

a virtual logistics warehouse information generation unit, used for generating information of a virtual logistics warehouse of the commodity object of the advance sale, the information of the virtual logistics warehouse including a virtual inventory quantity and information of a distribution coverage of the virtual logistics warehouse; wherein the virtual inventory quantity is determined based on the advance sale quantity, and the information of the distribution coverage of the virtual logistics warehouse is determined based on distribution coverage(s) of the physical logistics warehouse(s) associated with the first user; and a virtual logistics warehouse information provision unit, used for acquiring address information of a second user and determining whether the address information of the second user is located in the distribution coverage of the virtual logistics warehouse when logistics warehouse information of the commodity object is displayed to the second user, and providing the information of the virtual logistics warehouse of the commodity object to the second user if affirmative.

A system of processing commodity object information, includes:

a query unit, used for determining whether a designated commodity object is a commodity object treated as a future for conducting an advance sale by querying an inventory system database when logistics warehouse information of the designated commodity object is displayed to a second user, the inventory system database storing identifiers and virtual logistics warehouse information associated with commodity objects treated as futures for conducting advance sales, and the virtual logistics warehouse information including a virtual inventory quantity;

an information provision unit, used for providing virtual logistics warehouse information of the designated commodity object to the second user if affirmative;

a transaction order generation unit, used for generating a transaction order based on a first operation of the second user, and adding a future advance sale identifier in the transaction order;

a logistics order generation unit, used for generating a logistics order based on a second operation of the second user, and identifying that the generated logistics order is a future advance sale logistics order based on the future advance sale identifier in the transaction order;

a physical logistics warehouse information determination unit, used for determining a first user of the designated commodity object, and determining information of a physical logistics warehouse associated with the first user; and a delivery control unit, used for sending the generated logistics order to a warehousing system to notify the warehousing system to perform a delivery when an actual inventory related to the designated commodity object in the associated physical logistics warehouse satisfies a preset condition.

According to exemplary embodiments provided in the present disclosure, the present disclosure discloses the following technical effects:

The embodiments of the present disclosure obtain a virtual inventory quantity of a commodity object treated as a future advance sale based on virtual logistics warehouse information when a second user browses or purchases the commodity object, thereby avoiding an event of over-sale during the future advance sale. Furthermore, a determination is further made as to whether a delivery address of the second user is located in a virtual distribution coverage corresponding to the commodity object before the virtual logistics warehouse information is displayed to the second user. If affirmative, displaying thereof is performed, and the second user is allowed to carry out a purchase operation. As such, a second user who is located outside the distribution coverage is prevented from generating an invalid transaction order, thereby avoiding consumption of time and energy of the user and improving the usage rate of network computing resources.

Apparently, any product implementing the present disclosure does not need to achieve all the above advantages simultaneously.

BRIEF DESCRIPTION OF DRAWINGS

In order to describe technical solutions in the embodiments of the present disclosure or the existing technologies more clearly, accompanying drawings needed for the embodiments are briefly described herein. Apparently, the described accompanying drawings are merely some embodiments of the present disclosure. One of ordinary skill in the art can acquire other drawings based on these accompanying drawings without making creative efforts.

DETAILED DESCRIPTION

The technical solutions in the embodiments of the present disclosure are described herein in a clear and comprehensive manner with reference to the accompanying drawings in the embodiments of the present disclosure. Apparently, the described embodiments are merely part and not all of the embodiments of the present disclosure. All other embodiments acquired by one of ordinary skill in the art based on the embodiments of the present disclosure shall belong to the protection scope of the present disclosure.

First Embodiment

In an embodiment of the present disclosure, in order that an electronic commerce transaction platform system may support an advance sale form of a future advance sale in a better manner to avoid events of "over-sale" or going beyond a distribution coverage, etc., a concept of a virtual logistics warehouse is proposed. The so-called virtual logistics warehouse refers to a warehouse that does not exist in a real world, but a "virtual inventory" and corresponding information of a distribution coverage may be set up for the virtual logistics warehouse. As such, when information such as details of a future advance sale is displayed to a second user, a virtual inventory and information of a distribution coverage of an associated commodity may be displayed. Therefore, the quantity of the commodity object, which is allowed to be pre-ordered by the second user, will not exceed the virtual inventory, thereby avoiding an occurrence of an "over-sale" event. The second user who pre-orders the commodity may only be a user whose address is located in the distribution coverage of the virtual logistics warehouse, thereby avoiding an occurrence of an event of failing to distribute the commodity to the second user who has pre-ordered the commodity. An exemplary implementation is described in detail as follows.

Figure 1:
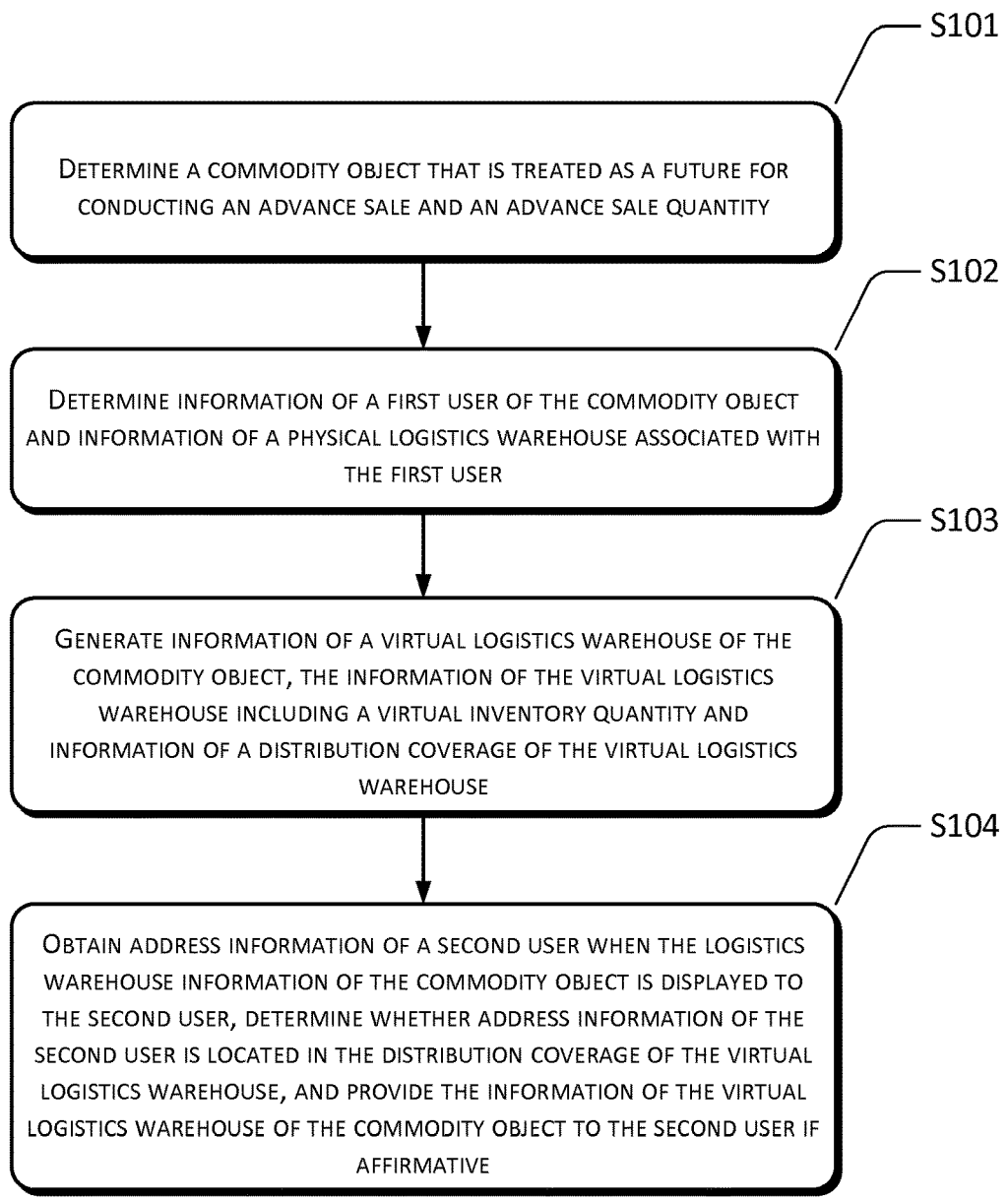
FIG. 1 is a flowchart of a method according to an embodiment of the present disclosure.

Referring to FIG. 1, a first embodiment of the present disclosure provides a method of processing commodity object information. The method may include the following:

S101 determines a commodity object that is treated as a future for conducting an advance sale and an advance sale quantity.

In the embodiment of the present disclosure, users are classified into a first user and a second user. For example, in a specific implementation, the first user may be referred to a selling user in a transaction platform system, and the second user may be a buying user in the transaction platform system.

Furthermore, in the embodiment of the present disclosure, a commodity object for a future advance sale may be a commodity object such as a major appliance (e.g., a refrigerator, a television or a washing machine, etc.), furniture, etc., that is sold by a first user who has a physical logistics warehouse. In order to differentiate from the concept of "virtual logistics warehouse" proposed in the embodiment of the present disclosure, a logistics warehouse associated with the first user is referred to as a "physical logistics warehouse" in the present disclosure, i.e., the physical logistics warehouse is a warehouse that exists in reality. This physical logistics warehouse may be subscribed by the first user from an organization that provides warehousing services, built by the first user, or may be subscribed or assigned from a transaction platform system, etc. The virtual logistics warehouse is merely a concept used in a computer inventory system database, and no real goods are stored therein.

The first user may publish information of a commodity object, which needs a unified distribution via such physical logistics warehouse, in the transaction platform system, so that the transaction platform system knows which commodity object that the first user needs to sell. For example, if commodities thereof have already been transported to the physical logistics warehouse, a warehouse warrant may be filled in on the transaction platform system to indicate which commodities have been transported to the physical logistics warehouse. In addition, for a commodity object that has not been transported to the physical logistics warehouse but may be distributed through the physical logistics warehouse in the future, information thereof may also be published in the transaction platform system. In this way, the system may know which commodities of various first users need to be sold and distributed through the physical logistics warehouse.

After the transaction platform system knows which commodities of the various first users need to be distributed through the physical logistics warehouse, the transaction platform system may predict future sale conditions of each commodity object of the various first users when a commodity object for a future advance sale is determined. For example, a first user may determine to participate in a future advance sale activity. For each first user who participates in the future advance sale activity, the system may determine which commodity may be in a relatively great demand in a certain period of time in the future, and predict a potential sales volume based on historical sales records, for example. For instance, a certain commodity object is predicted to have a potential sales volume of 1000 within next week, but the physical logistics warehouse currently has no or insufficient inventory of that commodity object. Meanwhile, the predicted sales volume may not be very accurate. If a first user transports a large number of commodities to the physical logistics warehouse hastily and the commodities cannot be sold timely, the commodities will occupy the physical logistics warehouse for a long time, and the occupancy cost of the logistics warehouse for the first user will increase. At the same time, when the warehouse is or is about to be saturated, such long-term occupancy will cause other commodities that are in a high demand cannot be stored in the warehouse timely. In these circumstances, the system may suggest the first user to sell this type of commodity as a future. As such, this is equivalent to allowing a second user to make a pre-order first, and then the first user to store the commodities in the physical logistics warehouse according to an actual quantity of the pre-order of the second user, thereby avoiding an occurrence of the above problem.

In other words, when determining a commodity object as a future for conducting an advance sale and an advance sale quantity, the transaction platform system may perform a prediction, and provide a suggestion to the first user, and determine a predicted commodity object to be the commodity object treated as the future for conducting the advance sale after acquiring an approval from the first user. The advance sale quantity may be determined directly based on a predicted quantity, or may be modified by the first user. Apparently, in a real application, a first user may also manually designate some commodity objects which future sales volumes are not predicted by the transaction platform system but needed to be treated as futures for advance sales by the first user or some newly launched commodities, etc., as the futures for the advance sales, and designate respective advance sale quantities. In this case, a commodity object treated as a future for performing an advance sale and an associated advance sale quantity may be determined based on configuration information inputted by the first user.

S102 determines information of a first user of the commodity object and information of a physical logistics warehouse associated with the first user.

Since the commodities that are treated as the future for the advance sale are commodities sold by the first user who is associated with the physical logistics warehouse in the embodiment of the present disclosure, the first user of the commodity object may be determined, and which physical logistics warehouse(s) is/are associated with the first user may be determined after the commodity object that is treated as the future for conducting the advance sale is determined.

S103 generates information of a virtual logistics warehouse of the commodity object, the information of the virtual logistics warehouse including a virtual inventory quantity and information of a distribution coverage of the virtual logistics warehouse, wherein, the virtual inventory quantity is determined based on the advance sale quantity, and the information of the distribution coverage of the virtual logistics warehouse is determined based on a distribution coverage of the physical logistics warehouse that is associated with the first user.

After the first user of the commodity object and which physical logistics warehouse(s) is/are associated with the first user are determined, information of a virtual logistics warehouse of the commodity object that is treated as the future for conducting the advance sale may be determined. The information of the virtual logistics warehouse may include two aspects, one aspect corresponding to a virtual inventory quantity, and the other aspect corresponding to information of a distribution coverage of the virtual logistics warehouse. The virtual inventory quantity may be determined based on the advance sale quantity determined at S101. For example, the advance sale quantity is directly used as the virtual inventory quantity. The distribution coverage of the virtual logistics warehouse may be determined based on a coverage of the physical logistics warehouse associated with the first user. In an embodiment, in a situation when the first user subscribes to a plurality of physical logistics warehouses, the distribution coverage of the virtual logistics warehouse is generally less than or equal to a sum of distribution coverage of the physical logistics warehouses associated with the first user. For example, a certain first user subscribes to two physical logistics warehouses. A distribution coverage of one warehouse is Hangzhou and a distribution coverage of another warehouse is Shanghai. If the first user has a commodity object as a future for conducting an advance sale, a distribution coverage of a virtual logistics warehouse corresponding to that commodity object may be Hangzhou, Shanghai, or Hangzhou and Shanghai. A specific coverage may be either determined according to a distribution capability of the first user, or set as a combination of the distribution coverages by default.

In short, in the embodiment of the present disclosure, information of virtual logistics warehouse(s) may be generated in advance for each commodity object that is needed to be set as a future for an advance sale, for example, may be stored in a form of Table 1:

TABLE 1

| Commodity Object ID | Virtual Inventory Quantity | Distribution Coverage of Virtual Logistics Warehouse |
|---|---|---|
| 100010 | 100 | Hangzhou + Shanghai + Beijing |
| 100002 | 200 | Hangzhou + Shanghai |
| . . . | . . . | . . . |

S104 obtains address information of a second user when the logistics warehouse information of the commodity object is displayed to the second user, determines whether address information of the second user is located in the distribution coverage of the virtual logistics warehouse, and provides the information of the virtual logistics warehouse of the commodity object to the second user if affirmative.

When the second user browses a detail information page of the commodity object or enters into a purchase page of the commodity object, inventory information of the commodity object generally needs to be displayed to the second user. Under normal circumstances, a determination may be made as to whether a distribution coverage of each physical logistics warehouse subscribed by the first user of the commodity object may cover the address of the second user based on the address information of the current second user. If affirmative, actual inventory information in a physical logistics warehouse which distribution coverage can cover the address of the second user is displayed to the second user. However, in an embodiment of the present disclosure, the physical logistics warehouse may not have the inventory. Therefore, the information of the virtual logistics warehouse of the commodity object may be displayed to the current user. Prior to displaying, a determination may further be made as to whether the address of the current user is located in the distribution coverage of the virtual logistics warehouse of the commodity object first. If affirmative, the information of the virtual logistics warehouse is displayed to the current second user, and an operation portal for pre-ordering the commodity object may further be provided to the second user. The operation portal may be a pre-order link, a button, etc., which is presented in a page or an application. The user may perform a pre-ordering operation via the operation portal. When determining that the address of the current user is not located in the distribution coverage of the virtual logistics warehouse of the commodity object, the second user may be prompted that the commodity object cannot be pre-ordered, or the operation portal is configured as a non-operable state directly, because even if the current buyer pre-orders the commodity object, the commodity object still cannot be distributed to the delivery address of the second user.

In a specific implementation, records in Table 1 may be queried according to an ID of a commodity object that is currently browsed by the second user. If the ID of the commodity object is found in Table 1, this indicates that the commodity object is a commodity object that is treated as a future for an advance sale. Meanwhile, a virtual inventory quantity and information of a distribution coverage of a virtual logistics warehouse of the commodity object may be extracted from the table. Therefore, after the delivery address information of the second user is acquired, a determination may be made as to whether the delivery address information of the second user is located in the distribution coverage of the virtual logistics warehouse. If affirmative, the information of the virtual logistics warehouse may be displayed.

Specifically, when obtaining the delivery address information of the second user, the delivery address information may be determined based on historical transaction records of the second user. For example, the historical transaction records normally record which delivery addresses have been used by the second user, and the most frequently used delivery address is used as the current delivery address of the second user. Alternatively, a delivery address that is used most recently may be used as the delivery address of the current buyer. Furthermore, since the transaction platform system normally records delivery address information used by the second user individually, the delivery address of the second user may also be determined based on the information recorded therein. For example, multiple delivery addresses may exist in delivery address record(s) related to the second user, and the second user may normally designate a default delivery address. In this case, the default delivery address designated by the user may be used as the delivery address of the second user.

In addition, since the future advance sale is an advance sale action, a payment can also be divided into two stages when the second user makes the payment. One stage is a payment of a deposit, and the other stage is a payment of a remaining balance, and these two stages generally have corresponding deadlines. Therefore, after determining the commodity object that is treated as a future for an advance sale, a deadline of a payment for a deposit and a deadline of a payment for a remaining balance may also be determined, for example, paying the deposit within three days, and paying the remaining balance within seven days, etc. In this way, when the second user views future advance sale information of the commodity object, these types of time deadline information may also be displayed to the second user. Accordingly, a transaction order may be generated when the second user makes a payment for the deposit. The virtual inventory quantity of the commodity object may be deducted according to a pre-order quantity designated by the second user. Thus, when another user views the virtual inventory quantity of the commodity object, the inventory quantity after deduction will be displayed thereto. Apparently, for the transaction platform system, the transaction order generated for the second user is equivalent to a record in a backend database. For example, a format of the transaction order may be as the one shown in Table 2:

TABLE 2

| Serial Number | Second User ID | Selling User ID | Commodity Object ID | Quantity | Specification Parameter | Time |
| --- | --- | --- | --- | --- | --- | --- |
| 1 | Second user 1 | Selling user 1 | 100010 | 2 | Parameter 1 | 2014/4/1 |
| 2 | Second user 2 | Selling user 2 | 100002 | 1 | Parameter 2 | 2014/4/2 |
| ... | ... | ... | ... | ... | ... | ... |

The specification parameter may be information of the commodity such as type and size, etc. When transaction orders corresponding to the records in Table 2 are generated, respective virtual inventory quantities of commodity objects in Table 1 are updated accordingly, i.e., deducting the original by two. For example, based on the transaction orders in Table 2, updated information of virtual logistics warehouses of the commodity objects is shown in Table 3:

TABLE 3

| Commodity Object ID | Virtual Inventory Quantity | Distribution Coverage of Virtual Logistics Warehouse |
| --- | --- | --- |
| 100010 | 98 | Hangzhou + Shanghai + Beijing |
| 100002 | 199 | Hangzhou + Shanghai |
| ... | ... | ... |

In a specific implementation, in order to differentiate from common transaction orders, a future advance sale identifier (for example, using True and False to indicate yes or no respectively) may be added in a transaction order. As such, when a logistics order is generated subsequently according to the transaction order, the commodity object in the order may be known to be a commodity object for a future advance sale, thus performing subsequent delivery processing according to a delivery strategy of the future advance sale. In this case, a database format corresponding to the transaction order may be shown in Table 4:

TABLE 4

| Serial Number | Second User ID | Selling User ID | Commodity Object ID | Quantity | Specification Parameter | Time | Future Pre-sale Identification |
| --- | --- | --- | --- | --- | --- | --- | --- |
| 1 | Second user 1 | Selling user 1 | 100010 | 2 | Parameter 1 | 2014/4/1 | True |
| 2 | Second user 2 | Selling user 2 | 100002 | 1 | Parameter 2 | 2014/4/2 | True |
| ... | ... | ... | ... | ... | ... | ... | |

Apparently, if the second user cancels the order after the transaction order is generated, the pre-order quantity corresponding to that order may be rolled back to the virtual inventory quantity. For example, the second user 1 cancels the transaction order corresponding to the serial number 1, and before the order is canceled, the information of the virtual logistics warehouse of the corresponding commodity object 10010 is the first record as shown in Table 3. Accordingly, the "virtual inventory quantity" in the first record of Table 3 is changed back to 100 after the transaction order is canceled.

If the second user pays the remaining balance within a stipulated time period after the transaction order is generated, a logistics order may be generated, and a determination may be made that what is currently generated is a future advance sale logistics order based on the future advance sale identifier in the transaction order. It should be noted that triggering operations for generating a transaction order and a logistics order in a real-world application may not necessarily be operations of a payment of a deposit and a payment of a remaining balance respectively. For example, a transaction order may be generated when a payment is made for a remaining balance, and a logistics order may be generated when other operations are performed, etc. Therefore, in an embodiment of the present disclosure, an operation used for generating a transaction order is referred to as a first operation, and an operation used for generating a logistics order is referred to as a second operation.

After the logistics order is generated, the physical logistics warehouse may not have a corresponding inventory in reality. As such, how to perform a delivery for the second user is also a problem to be solved. Therefore, an embodiment of the present disclosure may provide a corresponding future advance sale delivery strategy. In other words, the warehousing system may be notified of the delivery based on a preset future advance sale delivery strategy.

Specifically, when the warehousing system is notified of the delivery according to the preset future advance sale delivery strategy, a query may first be made as to whether the physical logistics warehouse subscribed by the first user has the inventory of the current commodity object. If affirmative, the logistics order is sent to the warehousing system. In this way, the warehousing system may make a delivery according to the information in the logistics order. If no inventory of the commodity object actually exists in the physical logistics warehouse associated with the first user when the logistics order is generated, the logistics order may be sent to the warehousing system only when a condition is met, and the delivery will be made by warehousing system. For example, in a specific implementation, the logistics order may be sent to the warehousing system when a notification of completing the storage of stocks in the warehouse is received from the first user, so that the warehousing system may make a delivery. In other words, the logistics order is sent to the warehousing system after the first user transports the commodity object to the physical logistics warehouse, and then the warehousing system makes a delivery thereof. Alternatively, in another implementation, a timing is started to count from the time when the logistics order is generated, and the logistics order is sent to the warehousing system at preset time intervals. Each time when the logistic order is received, the warehousing system may determine whether an inventory of the corresponding commodity object exists in the physical logistics warehouse. If not, no response is made or a message of delivery failure is returned. Until the actual inventory of the commodity object is found to exist in the physical logistics warehouse at a certain instance of the receipt of the logistics order, a response message indicating a success is returned, and an associated delivery is arranged. Alternatively, the warehousing system may be queried at certain time intervals whether the physical logistics warehouse has an associated inventory, and the logistics order is sent to the warehousing system only when the inventory exists. Otherwise, waiting continues.

Apparently, when the delivery is made for the second user, all associated goods are sent from a specific physical logistics warehouse. Therefore, in a case that the first user is associated with a plurality of physical logistics warehouses, a physical logistics warehouse which logistics distribution coverage can cover the delivery address of the second user is needed to be selected. In a specific implementation, after receiving the logistics order, the warehousing system determines a physical logistics warehouse from which a delivery is actually made for the second user based on the delivery address of the current second user and the distribution coverage of each of physical logistics warehouse subscribed by the current first user, and makes the delivery for the second user from that physical logistics warehouse. In an actual practice, a situation that different physical logistics warehouses cover a same region may exist. In this case, delivery priorities of the physical logistics warehouses may be set, and which physical logistics warehouse is used for the delivery may be determined according to the priorities.

However, there may exist a problem. The first user merely knows how many inventories need to be prepared for this future advance sale. If the first user is associated with a plurality of physical logistics warehouses, the first user does not know how many respective inventories need to be stored in each physical logistics warehouse when warehousing commodities. In this case, distribution may be made only based on experience or by averaging. As such, an insufficient or excessive inventory quantity in a physical logistics warehouses may still occur. Therefore, in an exemplary embodiment of the present disclosure, since the delivery address of the second user is unchanged, a determination may actually be made in advance about which physical logistics warehouse is used for making the delivery to the second user in a case that the physical logistics warehouses subscribed by the first user are ascertained. Therefore, in an embodiment of the present disclosure, when the user pays the deposit to generate the transaction order, a physical logistics warehouse that actually makes the delivery for the second user may be determined based on the delivery address of the second user and the distribution coverage of each physical logistics warehouse that is associated with the first user. Along with the generation of the transaction order, a quantity of the commodity object that needs to be stored in each physical logistics warehouse may then be updated synchronously, and notified to the first user in real time. In this way, when the first user stores the physical commodities in the physical logistics warehouses, more precise warehousing may be performed based on the quantity of the commodity object that needs to be stored in each physical logistics warehouse, thereby preventing an inventory quantity in a certain physical logistics warehouse from being excessive or insufficient.

Apparently, the determined information of the physical logistics warehouse may further be added into the transaction order. When the logistics order is generated subsequently, such information may also be added into the logistics order. In this way, when the warehousing system subsequently makes a delivery according to the logistics order, the delivery may be made directly according to the determined information of the physical logistics warehouse without the need of re-performing a determination based on information such as the delivery address of the second user. For example, in a specific implementation, if the information of the physical logistics warehouse is added, a database format corresponding to the transaction order may be represented in Table 5:

TABLE 5

| Number | Second User ID | First User ID | Commodity Object ID | Quantity | Specification Parameter | Time | Future Advance sale Identifier | Physical Logistics Warehouse |
|---|---|---|---|---|---|---|---|---|
| 1 | Second User 1 | Selling User 1 | 100010 | 2 | Parameter 1 | 2014/4/1 | True | Physical warehouse 1 |
| 2 | Second User 2 | Selling User 2 | 100002 | 1 | Parameter 2 | 2014/4/2 | True | Physical warehouse 2 |
| ... | ... | ... | ... | ... | ... | ... | | |

Figure 2:
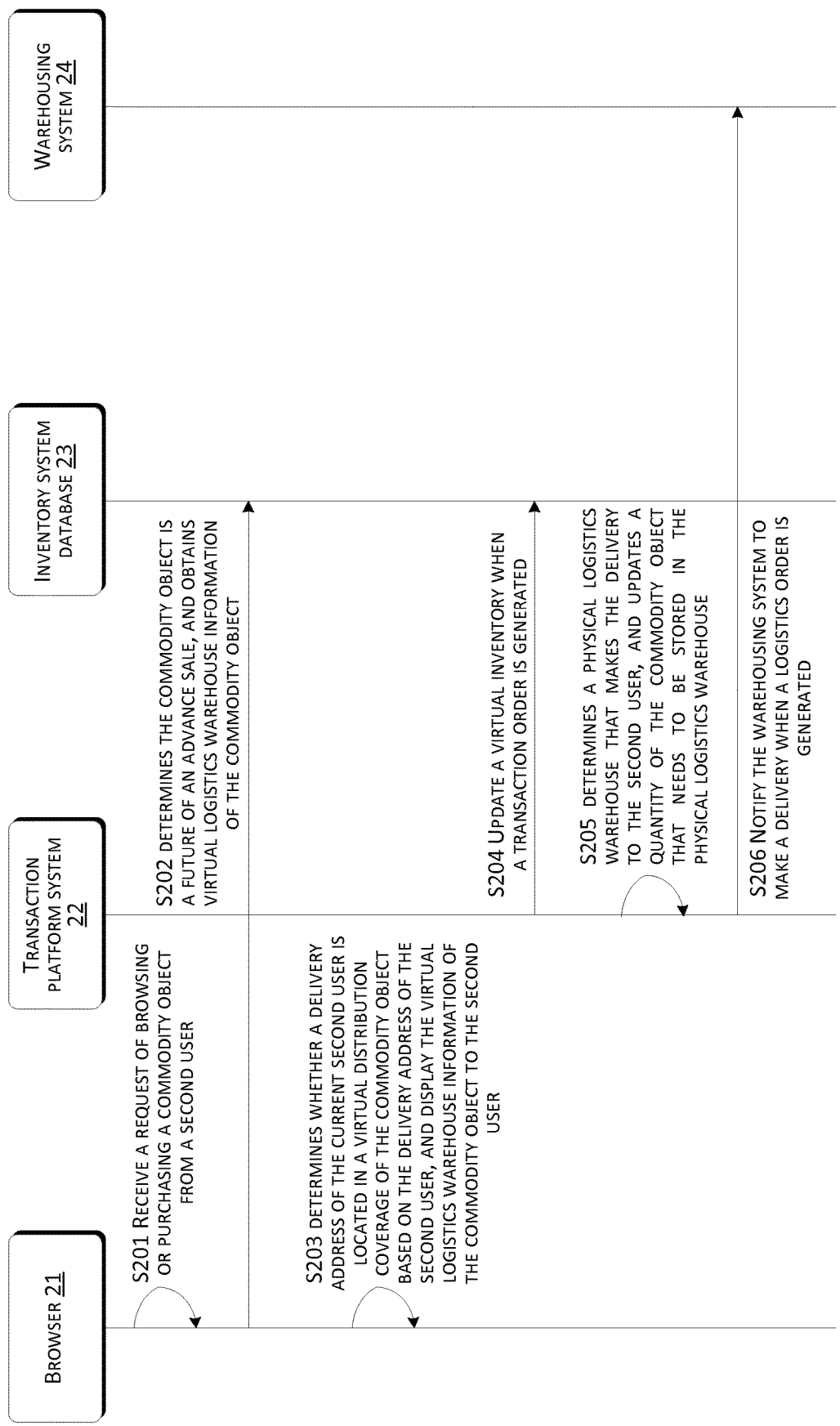
FIG. 2 is a flowchart of another method according to an embodiment of the present disclosure.

To better understand the technical solution provided in the embodiment of the present disclosure, a real life example is used for illustrating the specific implementation in more detail. In this example, a certain first user is assumed to be associated with a plurality of physical logistics warehouses. Each physical logistics warehouse have a respective distribution coverage (province, city, district, for example). Furthermore, the system constructs a virtual logistics warehouse for a first user who participates in in future advance sale. The virtual logistics warehouse includes two aspects of information. One is a virtual inventory quantity and another one is a virtual distribution coverage. The former one varies according to different commodity objects, and may be determined based on a quantity predicted by the system or an advance sale quantity inputted by the first user. The latter one may vary according to different first users, and is generally less than or equal to a sum of distribution coverages of physical logistics warehouses subscribed by the first user. Referring to FIG. 2, entities such as a browser 21, a transaction platform system 22, an inventory system database 23, and a warehousing system 24 are involved. A specific process may include the following:

S201 receives a request for browsing or purchasing a commodity object from a second user. Entities involved in this method block mainly include the browser 21 installed in a user terminal device and an accessed front-end interface of the transaction platform system 22. The request of the second user is sent when the second user performs an operation such as opening a detailed page of a certain commodity object when accessing the front-end interface.

S202 determines the commodity object is a future of an advance sale, and obtains information of a virtual logistics warehouse of the commodity object from the inventory system database 23 if affirmative. In other words, the information of the virtual logistics warehouse generated at S103 may be stored in the inventory system database, and the browser may acquire information of a virtual logistics warehouse of each commodity object from the inventory system database 23.

S203 determines whether a delivery address of the current second user is located in a virtual distribution coverage of the commodity object based on the delivery address of the second user, and displays the information of the virtual logistics warehouse of the commodity object to the second user.

S204 updates a virtual inventory in the information of the virtual logistics warehouse of the commodity object stored in the inventory system database 23 after the second user pays a deposit for the commodity object and a transaction order is generated.

S205 determines a physical logistics warehouse that makes the delivery to the second user based on the delivery address of the second user and a distribution coverage of each physical logistics warehouse subscribed by the first user, updates a quantity of the commodity object that needs to be stored in the physical logistics warehouse, which is returned to the first user as a feedback.

S206 notifies the warehousing system 24 of the delivery after the second user pays off the remaining balance for the commodity object and a logistics order is generated. The warehousing system 24 may find the physical logistics warehouse that actually makes the delivery to the user through routing, and make the delivery to the second user.

In brief, in the embodiments of the present disclosure, when a second user browses or purchases a commodity object that is a future of an advance sale, the knowledge of a virtual inventory quantity of the commodity object may be obtained based on virtual logistics warehouse information, thereby avoiding an over-sale event during the future advance sale. Furthermore, before the virtual logistics warehouse information is displayed to the second user, a determination is made as to whether a delivery address of the second user is located in a virtual distribution coverage corresponding to the commodity object. If affirmative, the display is performed, and the second user is allowed to perform a purchase operation. As such, a second user outside the distribution coverage is prevented from generating an invalid transaction order, thereby avoiding the consumption of time and energy of the user and improving the utilization rate of network computing resources.

Second Embodiment

Figure 3:
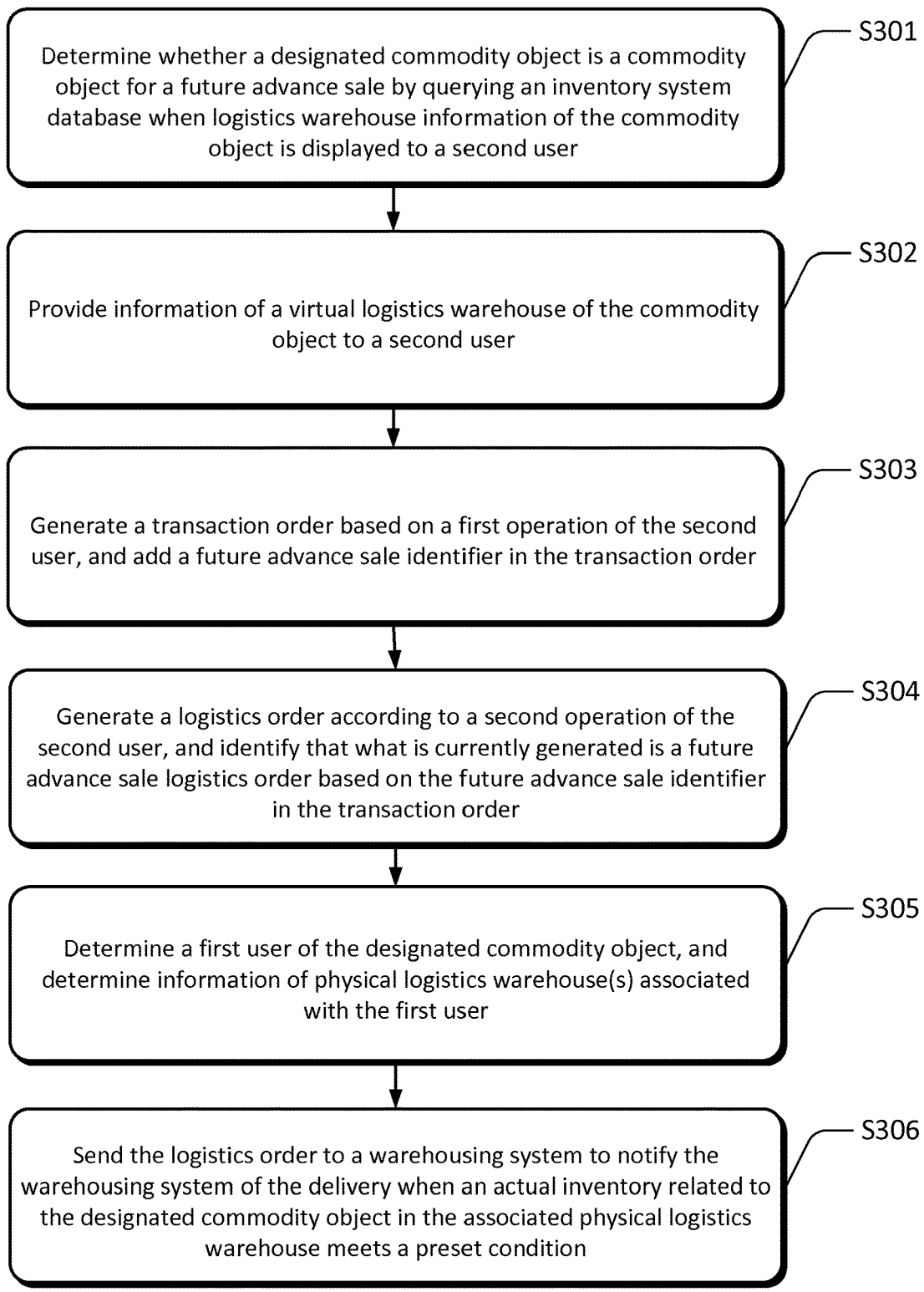
FIG. 3 is a flowchart of still another method according to an embodiment of the present disclosure.

The first embodiment mainly describes the implementations of the present disclosure from the perspective of generating virtual logistics warehouse information. In a second embodiment of the present disclosure, implementations of the present disclosure are described mainly from the perspective of front end processing. Referring to FIG. 3, the second embodiment of the present disclosure provides a method of processing commodity object information. The method may include the following:

S301 determines whether a designated commodity object is a commodity object for a future advance sale by querying an inventory system database when logistics warehouse information of the commodity object is displayed to a second user, the inventory system database storing respective identifiers of commodity objects for future advance sales and respective information of virtual logistics warehouses, information of a virtual logistics warehouse including an virtual inventory quantity.

S302 provides information of a virtual logistics warehouse of the commodity object to a second user.

Apparently, the information of the virtual logistics warehouse may further include information of a distribution coverage of the virtual logistics warehouse. The information of the distribution coverage of the virtual logistics warehouse is determined based on distribution coverage(s) of physical logistics warehouse(s) associated with a first user. Therefore, when the information of the virtual logistics warehouse of the commodity object is provided to the second user, a determination may further be made as to whether address information of the second user is located in the distribution coverage of the virtual logistics warehouse. If affirmative, the information of the virtual logistics warehouse of the commodity object, which may include a virtual inventory quantity or information of the distribution coverage of the virtual logistics warehouse, is provided to the second user.

S303 generates a transaction order based on a first operation of the second user, and adds a future advance sale identifier in the transaction order.

When the transaction order is generated based on the first operation of the second user, a target physical logistics warehouse may further be determined based on the address information of the second user and information of the distribution coverage(s) of the physical logistics warehouse(s) associated with the first user. A quantity of the commodity object that needs to be stored in the target physical logistics warehouse is updated according to a quantity of the commodity object pre-ordered by the second user, and the updated quantity is notified to the first user, so that the first user puts the commodity object in storage according to the quantity of the commodity object that needs to be stored in the target physical logistics warehouse.

S304 generates a logistics order according to a second operation of the second user, and identifies that what is currently generated is a future advance sale logistics order based on the future advance sale identifier in the transaction order.

S305 determines a first user of the designated commodity object, and determines information of physical logistics warehouse(s) associated with the first user.

S306 sends the logistics order to a warehousing system to notify the warehousing system of the delivery when an actual inventory related to the designated commodity object in the associated physical logistics warehouse meets a preset condition.

Implementation details in the method blocks of the second embodiment are all described in the first embodiment, and can be implemented accordingly, which are not redundantly described herein.

Figure 4:
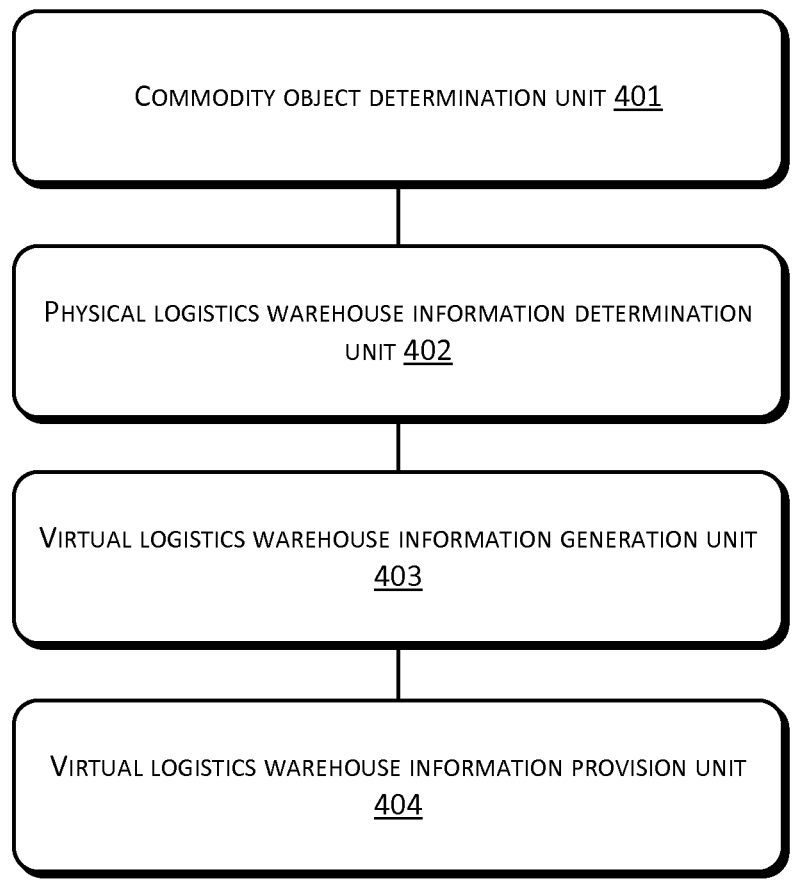
FIG. 4 is a schematic diagram of a system according to an embodiment of the present disclosure.

Corresponding to the method of processing commodity object information provided in the first embodiment of the present disclosure, an embodiment of the present disclosure further provides a system of processing commodity object information. Referring to FIG. 4, the system may include:

a commodity object determination unit 401, used for determining a commodity object treated as a future for conducting an advance sale and an advance sale quantity;

a physical logistics warehouse information determination unit 402, used for determining information of a first user of the commodity object of the advance sale and information of physical logistics warehouse(s) associated with the first user;

a virtual logistics warehouse information generation unit 403, used for generating information of a virtual logistics warehouse of the commodity object of the advance sale, the information of the virtual logistics warehouse including a virtual inventory quantity and information of a distribution coverage of the virtual logistics warehouse; wherein the virtual inventory quantity is determined based on the advance sale quantity, and the information of the distribution coverage of the virtual logistics warehouse is determined based on distribution coverage(s) of the physical logistics warehouse(s) associated with the first user; and a virtual logistics warehouse information provision unit 404, used for acquiring address information of a second user and determining whether the address information of the second user is located in the distribution coverage of the virtual logistics warehouse when logistics warehouse information of the commodity object is displayed to the second user, and providing the information of the virtual logistics warehouse of the commodity object to the second user if affirmative.

In a specific implementation, the system may further include:

a virtual inventory updating unit used for updating the virtual inventory quantity for the commodity object that is treated as the future for conducting the advance sale according to a purchase quantity of the second user after a transaction order is generated based on a first operation of the second user to facilitate displaying of the updated virtual inventory quantity when inventory information of the commodity object is needed to be displayed to other users.

Furthermore, in order to correctly distinguish an order for a common commodity from an order for a future advance sale commodity object in a subsequent process, the system may further include:

an identifier adding unit used for adding a future advance sale identifier to the transaction order for the commodity object of the advance sale after the transaction order is generated based on the first operation of the second user;

an identifying unit used for identifying that what is currently generated is a future advance sale logistics order based on the future advance sale identifier in the transaction order when a logistics order is generated based on a second operation of the second user; and a delivery notification unit used for sending the logistics order to a warehousing system to notify the warehousing system to make a delivery according to a preset future advance sale delivery strategy.

In a specific implementation, the delivery notification unit may include:

a query sub-unit used for querying whether an actual inventory of the commodity object exists in the physical logistics warehouse associated with the first user; and a first sending sub-unit used for sending the logistics order to the warehousing system so that the warehousing system makes the delivery if affirmative.

In addition, the delivery notification unit may further include:

a logistics order state setting sub-unit used for setting the logistics order as a waiting state when no actual inventory of the commodity object exists in the physical logistics warehouse associated with the first user; and a second sending sub-unit used for sending the logistics order to the warehousing system so that the warehousing system makes the delivery when the actual inventory of the designated commodity object in the associated physical logistics warehouse satisfies a preset condition.

The second sending sub-unit may be used for:

sending the logistics order to the warehousing system so that the warehousing system makes the delivery when a warehouse complete notification of the commodity object of the advance sale associated with the first user is received.

Alternatively, the second sending sub-unit may be used for:

starting a timing when the logistics order is set as the waiting state; and sending the logistics order to the warehousing system at preset time intervals so that the warehousing system feeds back response information and makes the delivery upon determining that the physical logistics warehouse generates the actual inventory of the commodity object.

Furthermore, in order to carry out a more precise and targeted warehousing operation when the first user puts the commodity object into storage, and prevent an occurrence of an event of excessive or insufficient actual inventory, the system may further include:

a target physical logistics warehouse determination unit used for determining a target physical logistics warehouse according to address information of the second user and distribution coverage information of each physical logistics warehouse associated with the first user when the transaction order is generated;

a notification unit used for updating a quantity of the commodity object that needs to be stored in the target physical logistics warehouse according to a quantity of the commodity object pre-ordered by the second user, and notifying the first user of the updated quantity so that the first user puts the commodity object into storage according to the quantity of the commodity object that needs to be stored in the target physical logistics warehouse.

In addition, the system may further include:

a target physical logistics warehouse information adding unit used for adding information of the target physical logistics warehouse into the transaction order, and adding the information of the target physical logistics warehouse into the logistics order when the logistics order is generated, so that the warehousing system is notified of the target physical logistics warehouse information when the warehousing system is notified of the delivery, and the warehousing system makes the delivery for the current user from the target physical logistics warehouse.

Figure 5:
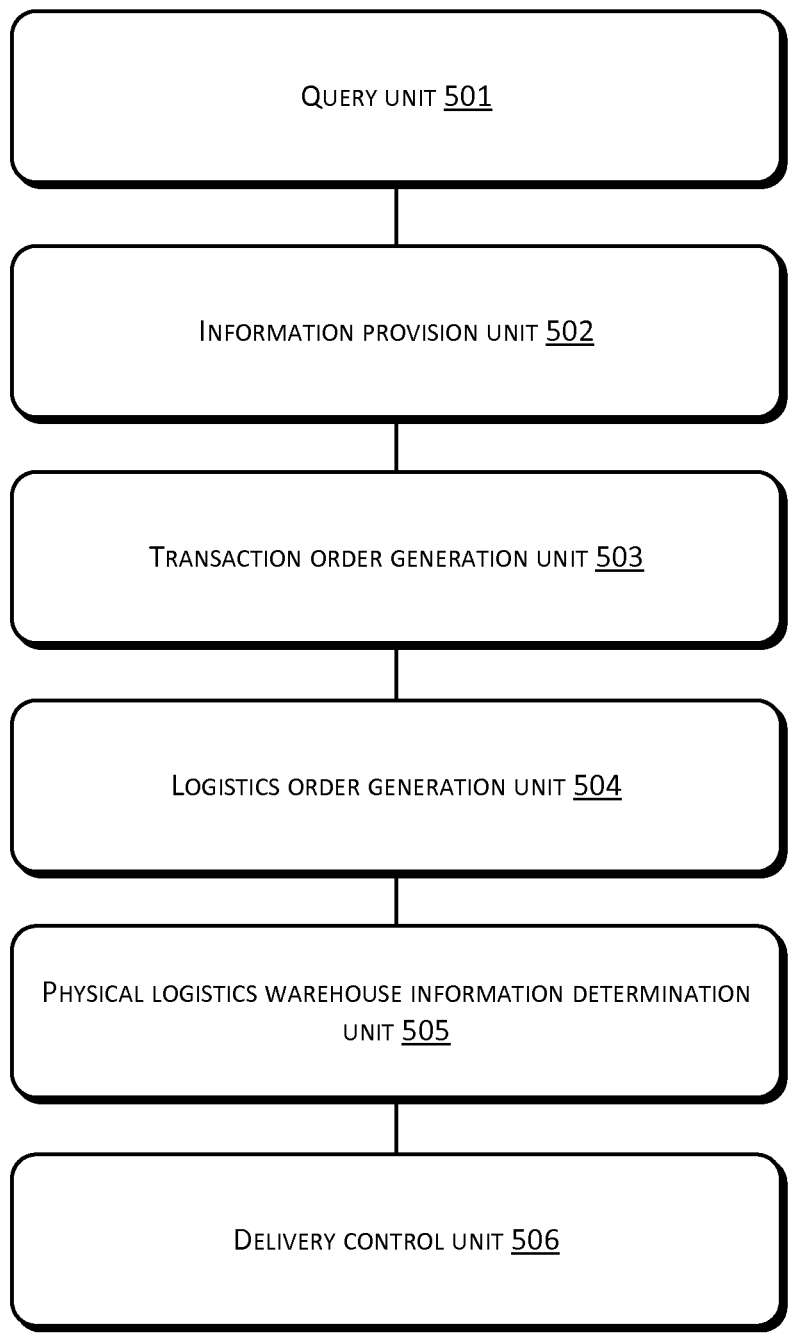
FIG. 5 is a schematic diagram of another system according to an embodiment of the present disclosure.

Corresponding to the method of processing commodity object information provided in the second embodiment of the present disclosure, an embodiment of the present disclosure further provides a system for processing commodity object information. Referring to FIG. 5, the system may include:

a query unit 501 used for determining whether a designated commodity object is a commodity object treated as a future for conducting an advance sale by querying an inventory system database when logistics warehouse information of the designated commodity object is displayed to a second user, the inventory system database storing identifiers and information of a virtual logistics warehouse associated with commodity objects treated as futures for conducting advance sales, and the information of the virtual logistics warehouse including a virtual inventory quantity;

an information provision unit 502 used for providing virtual logistics warehouse information of the designated commodity object to the second user if affirmative;

a transaction order generation unit 503 used for generating a transaction order based on a first operation of the second user, and adding a future advance sale identifier in the transaction order;

a logistics order generation unit 504 used for generating a logistics order based on a second operation of the second user, and identifying that the generated logistics order is a future advance sale logistics order based on the future advance sale identifier in the transaction order;

a physical logistics warehouse information determination unit 505 used for determining a first user of the designated commodity object, and determining information of a physical logistics warehouse associated with the first user; and a delivery control unit 506 used for sending the generated logistics order to a warehousing system to notify the warehousing system to perform a delivery when an actual inventory related to the designated commodity object in the associated physical logistics warehouse satisfies a preset condition.

The information of the virtual logistics warehouse further includes information of a distribution coverage of the virtual logistics warehouse, and the information of the distribution coverage of the virtual logistics warehouse is determined based on a distribution coverage of the physical logistics warehouse associated with the first user; and when the logistics warehouse information of the designated commodity object is displayed for the second user, the system may further include:

a determination unit used for determining whether address information of the second user is located in the distribution coverage of the virtual logistics warehouse, and providing the information of the virtual logistics warehouse of the commodity object to the second user if affirmative.

Furthermore, when the transaction order is generated based on the first operation of the second user, the system may further include:

a target physical logistics warehouse determination unit used for determining a target physical logistics warehouse according to the address information of the second user and information of the distribution coverage of the physical logistics warehouses associated with the first user; and a notification unit used for updating a quantity of the commodity object that needs to be stored in the target physical logistics warehouse according to the quantity of the commodity object pre-ordered by the second user, and notifying the updated quantity to the first user so that the first user puts the commodity object into storage according to the quantity of the commodity object that needs to be stored in the target physical logistics warehouse.

In short, the embodiments of the present disclosure obtain a virtual inventory quantity of a commodity object treated as a future advance sale based on virtual logistics warehouse information when a second user browses or purchases the commodity object, thereby avoiding an event of over-sale during the future advance sale. Furthermore, a determination is further made as to whether a delivery address of the second user is located in a virtual distribution coverage corresponding to the commodity object before the virtual logistics warehouse information is displayed to the second user. If affirmative, displaying thereof is performed, and the second user is allowed to carry out a purchase operation. As such, a second user who is located outside the distribution coverage is prevented from generating an invalid transaction order, thereby avoiding consumption of time and energy of the user and improving the usage rate of network computing resources.

From the description of the foregoing implementations, one skilled in the art can clearly understand that the present disclosure can be implemented in software with a necessary general purpose hardware platform. Based on this understanding, the technical solutions of the present disclosure in essence or the part of contribution to the existing technologies may be embodied in a form of a software product. The computer software product may be stored in a storage medium, such as a read-only memory (ROM)/random access memory (RAM), a magnetic disk, or an optical disk, etc., and includes a number of instructions used to instruct a computing device (which may be a personal computer, a server, or a network device, etc.) to execute the embodiments of the present disclosure or the methods described in certain parts of the embodiments.

Figure 6:
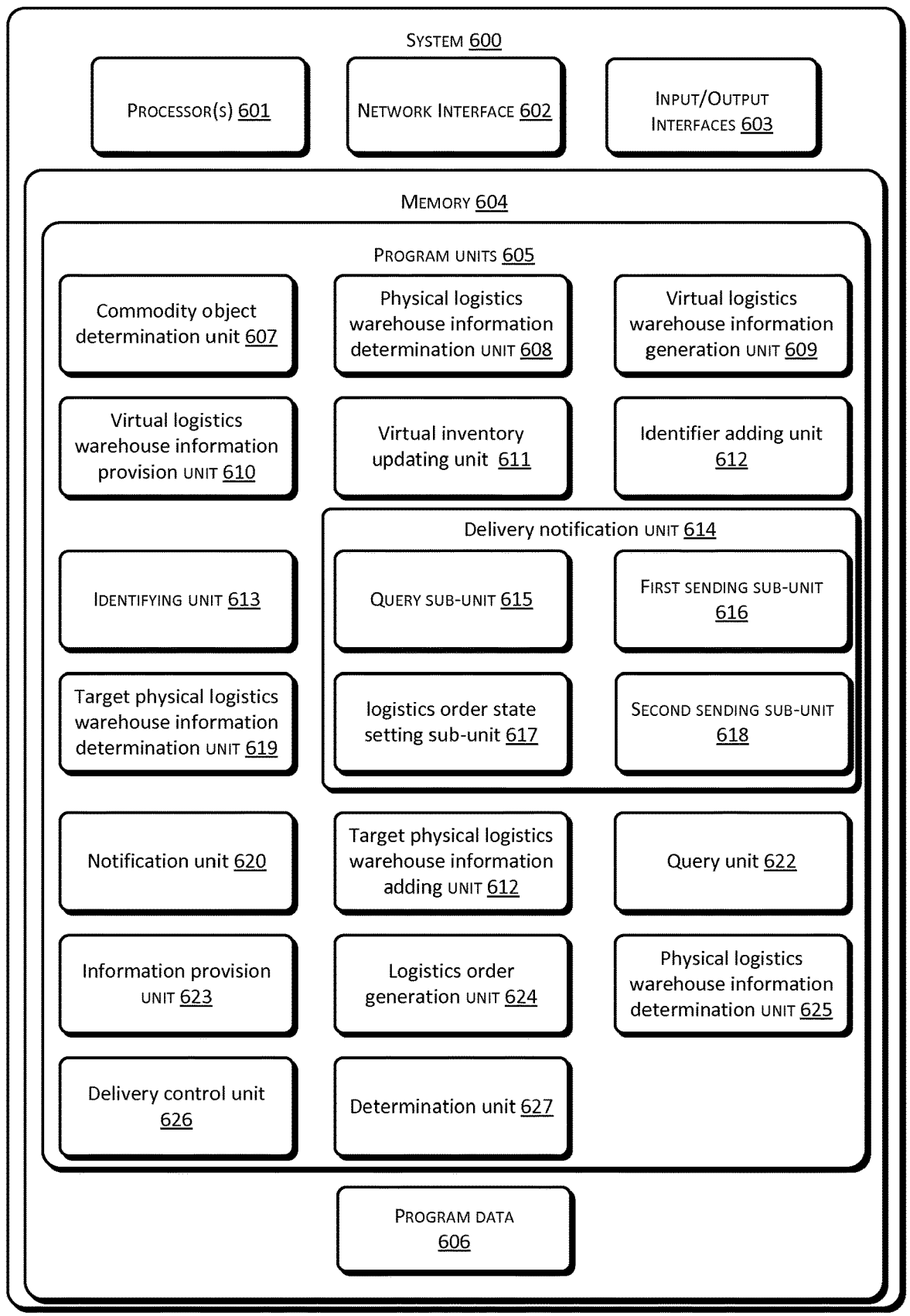
FIG. 6 is a structural diagram of the example system as described in FIGS. 4 and 5.

For example, FIG. 6 shows an example system 600, such as the systems as described above, in more detail. In an embodiment, the system 600 may include, but is not limited to, one or more processors 601, a network interface 602, an input/output interface 603 and memory 604.

The memory 604 may include a form of computer readable media such as a volatile memory, a random access memory (RAM) and/or a non-volatile memory, for example, a read-only memory (ROM) or a flash RAM. The memory 604 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 604 may include program units 605 and program data 606. In an embodiment, the program units 605 may include a commodity object determination unit 607, a physical logistics warehouse information determination unit 608, a virtual logistics warehouse information generation unit 609, a virtual logistics warehouse information provision unit 610, a virtual inventory updating unit 611, an identifier adding unit 612, an identifying unit 613, a delivery notification unit 614 (which may include a query sub-unit 615, a first sending sub-unit 616, a logistics order state setting sub-unit 617 and/or a second sending sub-unit 618), a target physical logistics warehouse determination unit 619, a notification unit 620, a target physical logistics warehouse information adding unit 621, a query unit 622, an information provision unit 623, a logistics order generation unit 624, a physical logistics warehouse information determination unit 625, a delivery control unit 626 and/or a determination unit 627. Details of these units and sub-units may be found in the foregoing description and are therefore not redundantly described herein.

The embodiments in the specification are described in a progressive manner. Same or similar parts of the embodiments may be acquired with reference to each other. Emphasis of each embodiment is different from those of other embodiments. Especially, the description of the systems or system embodiments is simple due to respective similarities to the method embodiments, and related parts may be acquired with reference to the description of the method embodiments. The systems and system embodiments described above are merely schematic. The units described as separate parts therein may or may not be physically separated from each other. Components displayed as units may or may not be physical units, which may be situated in a single location, or may be distributed among a plurality of network units. A part or all of the modules may be selected according to actual needs to achieve the objectives of the solutions of the embodiments. One of ordinary skill in the art can understand and implement the present disclosure without making any creative efforts.

The methods and the systems for processing commodity object information provided by the present disclosure are described in detail above. Specific examples are used in this text for illustrating the principles and implementations of the present disclosure. The description of the foregoing embodiments is merely intended to help understand the methods of the present disclosure and a concept thereof. Furthermore, one of ordinary skill in the art can made variations to exemplary implementations and application scopes based on the spirit of the present disclosure. In view of the above, the content of this disclosure should not be construed as a limitation to the present disclosure.

What is claimed is:

1. A method implemented by one or more computing devices, the method comprising:
    determining a commodity object treated as a future for conducting an advance sale and an advance sale quantity;
    determining information of a seller of the commodity object of the advance sale and information of one or more physical logistics warehouses that are associated with the seller;
    generating information of a virtual logistics warehouse of the commodity object of the advance sale, the information of the virtual logistics warehouse including a virtual inventory quantity of the commodity object and information of a distribution coverage of the virtual logistics warehouse, wherein the virtual inventory quantity is determined based at least in part on the advance sale quantity, and wherein the advance sale quantity is determined based on a predicted quantity of sale of the commodity object, wherein the distribution coverage of the virtual logistics warehouse is less than the distribution coverages of the one or more physical logistics warehouses that are associated with the seller;
    acquiring address information of a buyer and determining whether the address information of the buyer is located in the distribution coverage of the virtual logistics warehouse;
    in response to determining that the address information of the buyer is located in the distribution coverage of the virtual logistics warehouse, providing the information of the virtual logistics warehouse of the commodity object to the buyer;
    generating a transaction order in response to a first operation of the buyer with respect to the commodity object, wherein the virtual inventory quantity of the commodity object is changed based on the generation of the transaction order; and
    generating a logistics order in response to a second operation of the buyer with respect to the commodity object, wherein a delivery of the commodity object is made based on the logistics order.

2. The method of claim 1, wherein the first operation comprises a payment of a deposit for a pre-order of the commodity object by the buyer, and the second operation comprises a payment of a remaining balance for the pre-order of the commodity object by the buyer.

3. The method of claim 1, further comprising:
    updating the virtual inventory quantity for the commodity object that is treated as the future for conducting the advance sale according to a purchase quantity of the buyer after the transaction order is generated based on the first operation of the buyer to facilitate displaying of the updated virtual inventory quantity when inventory information of the commodity object is to be displayed to one or more other users.

4. The method of claim 1, wherein the advance sale quantity is designated by the seller.

5. The method of claim 1, further comprising
adding a future advance sale identifier to the transaction order;
identifying that the logistics order is a future advance sale logistics order based at least in part on the future advance sale identifier in the transaction order; and
sending the logistics order to a warehousing system to notify a warehousing system to make the delivery according to a preset future advance sale delivery strategy.

6. The method of claim 5, wherein the preset future advance sale delivery strategy comprises:
querying whether an actual inventory of the commodity object exists in at least one physical logistics warehouse of the one or more physical logistics warehouses that are associated with the seller; and
in response to that an actual inventory of the commodity object exists in at least one physical logistics warehouse of the one or more physical logistics warehouses that are associated with the seller, sending the logistics order to the warehousing system so that the warehousing system makes the delivery.

7. The method of claim 5, wherein the preset future advance sale delivery strategy comprises:
querying whether an actual inventory of the commodity object exists in at least one physical logistics warehouse of the one or more physical logistics warehouses that are associated with the seller;
setting the logistics order as a waiting state when no actual inventory of the commodity object exists in the physical logistics warehouse associated with the seller; and
sending the logistics order to the warehousing system so that the warehousing system makes the delivery when the actual inventory of the designated commodity object in the associated physical logistics warehouse satisfies a preset condition.

8. The method of claim 7, wherein the preset condition comprises receiving a warehouse completed notification of the commodity object of the advance sale from the seller.

9. The method of claim 7, wherein sending the logistics order to the warehousing system so that the warehousing system makes the delivery when the actual inventory of the designated commodity object in the associated physical logistics warehouse satisfies the preset condition, comprises:
starting a timing when the logistics order is set as the waiting state; and
sending the logistics order to the warehousing system at preset time intervals so that the warehousing system feeds back response information and makes the delivery upon determining that the physical logistics warehouse generates the actual inventory of the commodity object.

10. The method of claim 1, further comprising:
determining a target physical logistics warehouse according to the address information of the buyer and distribution coverage information of each physical logistics warehouse associated with the seller when the transaction order is generated;
updating a quantity of the commodity object that needs to be stored in the target physical logistics warehouse according to a quantity of the commodity object pre-ordered by the buyer; and
notifying the seller of the updated quantity to facilitate the seller to put the commodity object into storage according to the quantity of the commodity object that needs to be stored in the target physical logistics warehouse.

11. The method of claim 10, further comprising:
adding information of the target physical logistics warehouse into the transaction order;
adding the information of the target physical logistics warehouse into a logistics order when the logistics order is generated; and
sending the logistics order a warehousing system to notify the warehousing system to make a delivery of the commodity object to the buyer from the target physical logistics warehouse.

12. One or more non-transitory computer-readable media storing executable instructions that, when executed by one or more processors, cause the one or more processors to perform acts comprising:
querying an inventory system database to determine whether a designated commodity object of a seller is a commodity object treated as a future for conducting an advance sale and an advance sale quantity;
providing information of a virtual logistics warehouse of the designated commodity object to the buyer in response to determining that the designated commodity object is the commodity object treated as the future for conducting the advance sale, the information of the virtual logistics warehouse including a virtual inventory quantity of the commodity object, wherein the virtual inventory quantity is determined based at least in part on the advance sale quantity, and wherein the advance sale quantity is determined based on a predicted quantity of sale of the commodity object, wherein the distribution coverage of the virtual logistics warehouse is less than or equal to the distribution coverages of the one or more physical logistics warehouses that are associated with the seller;
generating a transaction order in response to a first operation of the buyer with respect to the commodity object, wherein the virtual inventory quantity of the commodity object is changed based on the generation of the transaction order; and
generating a logistics order in response to a second operation of the buyer with respect to the commodity object, wherein a delivery of the commodity object is made based on the logistics order.

13. The one or more non-transitory computer-readable media of claim 12, wherein the inventory system database stores respective identifiers and information of respective virtual logistics warehouses associated with commodity objects treated as futures for conducting advance sales, and the information of the respective virtual logistics warehouses including respective virtual inventory quantities of the commodity objects.

14. The one or more non-transitory computer-readable media of claim 12, the acts further comprising:
adding a future advance sale identifier in the transaction order, the future advance sale identifier in the transaction order enabling identifying of the logistics order as a future advance sale logistics order.

15. The one or more non-transitory computer-readable media of claim 14, the acts further comprising:
determining information of a physical logistics warehouse associated with the seller; and
sending the logistics order to a warehousing system to notify the warehousing system to perform a delivery when an actual inventory related to the designated commodity object in the physical logistics warehouse satisfies a preset condition.

16. The one or more non-transitory computer-readable media of claim 14, the acts further comprising:
   determining a target physical logistics warehouse based on address information of the buyer and information of one or more distribution coverages of one or more physical logistics warehouses associated with the seller when the transaction order is generated based on the first operation of the buyer;
   updating a quantity of the commodity object that needs to be stored in the target physical logistics warehouse according to a quantity of the commodity object pre-ordered by the buyer; and
   notifying the updated quantity to the seller so that the seller puts the commodity object into storage according to the quantity of the commodity object that needs to be stored in the target physical logistics warehouse.

17. The one or more non-transitory computer-readable media of claim 14, wherein the first operation comprises a payment of a deposit for a pre-order of the commodity object by the buyer, and the second operation comprises a payment of a remaining balance for the pre-order of the commodity object by the buyer.

18. The one or more non-transitory computer-readable media of claim 12, wherein the information of the virtual logistics warehouse includes information of a distribution coverage of the virtual logistics warehouse, the information of the distribution coverage of the virtual logistics warehouse being determined based on one or more distribution coverages of one or more physical logistics warehouses associated with the seller.

19. The one or more non-transitory computer-readable media of claim 12, the acts further comprising:
   determining whether address information of the buyer is located in the distribution coverage of the virtual logistics warehouse; and
   providing the information of the virtual logistics warehouse of the commodity object to the buyer in response to determining that address information of the buyer is located in the distribution coverage of the virtual logistics warehouse.

20. A system comprising:
   one or more processors;
   memory;
   a commodity object determination unit stored in the memory and executable by the one or more processors to determine a commodity object treated as a future for conducting an advance sale and an advance sale quantity;
   a physical logistics warehouse information determination unit stored in the memory and executable by the one or more processors to determine information of a seller of the commodity object of the advance sale and information of one or more physical logistics warehouses associated with the seller;
   a virtual logistics warehouse information generation unit stored in the memory and executable by the one or more processors to generate information of a virtual logistics warehouse of the commodity object of the advance sale, the information of the virtual logistics warehouse including a virtual inventory quantity of the commodity object and information of a distribution coverage of the virtual logistics warehouse; wherein the virtual inventory quantity is determined based on the advance sale quantity, and the advance sale quantity is determined based on a predicted quantity of sale of the commodity object, and the information of the distribution coverage of the virtual logistics warehouse is determined based on one or more distribution coverages of the one or more physical logistics warehouses associated with the seller, wherein the distribution coverage of the virtual logistics warehouse is less than or equal to the distribution coverages of the one or more physical logistics warehouses that are associated with the seller;
   a virtual logistics warehouse information provision unit stored in the memory and executable by the one or more processors to acquire address information of a buyer, determine whether the address information of the buyer is located in the distribution coverage of the virtual logistics warehouse, and provide the information of the virtual logistics warehouse of the commodity object to the buyer if affirmative in response to determining that the address information of the buyer is located in the distribution coverage of the virtual logistics warehouse;
   a transaction order generation unit stored in the memory and executable by the one or more processors to generate a transaction order based on a first operation of the buyer with respect to the commodity object, wherein the virtual inventory quantity of the commodity object is changed based on the generation of the transaction order; and
   a logistics order generation unit stored in the memory and executable by the one or more processors to generate a logistics order based on a second operation of the buyer with respect to the commodity object, wherein a delivery of the commodity object is made based on the logistics order.

* * * * *

UNITED STATES PATENT AND TRADEMARK OFFICE
CERTIFICATE OF CORRECTION

PATENT NO. : 10,671,968 B2
APPLICATION NO. : 14/692644
DATED : June 2, 2020
INVENTOR(S) : Yueyang Chen et al.

It is certified that error appears in the above-identified patent and that said Letters Patent is hereby corrected as shown below:

In the Claims

Claim 12, Column 22, Line 33:
"virtual logistics warehouse is less than or equal to the distribution coverages" should read -- virtual logistics warehouse is less than the distribution coverages --.

Claim 20, Column 24, Line 22:
"virtual logistics warehouse is less than or equal to the distribution coverages" should read -- virtual logistics warehouse is less than the distribution coverages --.

Claim 20, Column 24, Line 33:
"commodity object to the buyer if affirmative in response to" should read -- commodity object to the buyer in response to --.

Signed and Sealed this
Fifth Day of September, 2023

Katherine Kelly Vidal
*Director of the United States Patent and Trademark Office*